(12) United States Patent
Li et al.

(10) Patent No.: US 10,019,797 B2
(45) Date of Patent: Jul. 10, 2018

(54) RENDERING EXPANDED LUMEN IMAGE

(71) Applicant: Shenyang Neusoft Medical Systems Co., Ltd., Shenyang (CN)

(72) Inventors: Bingsheng Li, Shenyang (CN); Wei He, Shenyang (CN)

(73) Assignee: Shenyang Neusoft Medical Systems Co., Ltd., Shenyang, Liaoning (CN)

( * ) Notice: Subject to any disclaimer, the term of this patent is extended or adjusted under 35 U.S.C. 154(b) by 33 days.

(21) Appl. No.: 15/281,583

(22) Filed: Sep. 30, 2016

(65) Prior Publication Data

US 2017/0124702 A1 May 4, 2017

(30) Foreign Application Priority Data

Nov. 3, 2015 (CN) .......................... 2015 1 07385601

(51) Int. Cl.
*G06K 9/00* (2006.01)
*G06T 7/00* (2017.01)
*G06T 17/10* (2006.01)

(52) U.S. Cl.
CPC ............ *G06T 7/0012* (2013.01); *G06T 17/10* (2013.01)

(58) Field of Classification Search
CPC ............................... G06T 7/0012; G06T 17/10
See application file for complete search history.

(56) References Cited

U.S. PATENT DOCUMENTS

| | | | |
|---|---|---|---|
| 4,835,688 A | 5/1989 | Kimura | |
| 6,718,193 B2 | 4/2004 | Knoplioch et al. | |
| 8,487,938 B2 | 7/2013 | Latta et al. | |
| 8,509,505 B2 * | 8/2013 | Kobayashi | G06T 7/0012 |
| | | | 382/128 |
| 2004/0024333 A1 * | 2/2004 | Brown | A61B 10/0275 |
| | | | 600/564 |

(Continued)

FOREIGN PATENT DOCUMENTS

| CN | 1666708 A | 9/2005 |
|---|---|---|
| CN | 101065052 A | 10/2007 |

(Continued)

OTHER PUBLICATIONS

Yao Demin et al., "Research on virtual endoscope system based on computer aided identification," Chinese Doctoral Dissertation Full-text Database, Mar. 15, 2009; No. 3, pp. 16-91, with English-language Abstract (pp. 7-8).

(Continued)

*Primary Examiner* — Gregory M Desire
(74) *Attorney, Agent, or Firm* — Fish & Richardson P.C.

(57) ABSTRACT

Methods, systems, and apparatus including computer programs encoded on a computer storage medium, for rendering an expanded lumen image are disclosed. The methods include extracting a center line of a lumen from a three-dimensional lumen image and obtaining a plurality of viewpoints by sampling the center line, establishing a spherical projection plane for each of the viewpoints, a point on the spherical projection plane corresponding to a point on an inner wall of the lumen, determining a relationship between a two-dimensional projection plane and the inner wall of the lumen according to a corresponding relationship between the spherical projection plane and the two-dimensional projection plane, and obtaining a two-dimensional expanded image of the three-dimensional lumen image by performing image rendering on the two-dimensional projection plane according to the determined relationship between the two-dimensional projection plane and the inner wall of the lumen.

17 Claims, 6 Drawing Sheets

(56) References Cited

U.S. PATENT DOCUMENTS

| | | | |
|---|---|---|---|
| 2005/0085841 A1* | 4/2005 | Eversull | A61B 17/3431 606/190 |
| 2005/0226483 A1 | 10/2005 | Geiger | |
| 2005/0245803 A1 | 11/2005 | Glenn, Jr. et al. | |
| 2008/0273777 A1* | 11/2008 | Luboz | G06T 17/20 382/130 |
| 2012/0230559 A1* | 9/2012 | Itai | G06T 7/0012 382/128 |
| 2013/0102903 A1* | 4/2013 | Tanaka | A61B 8/08 600/447 |
| 2014/0100453 A1 | 4/2014 | Kemp | |
| 2014/0146044 A1 | 5/2014 | Cvetko | |
| 2017/0124702 A1* | 5/2017 | Li | G06T 7/0012 |

FOREIGN PATENT DOCUMENTS

| | | |
|---|---|---|
| CN | 101203889 A | 6/2008 |
| CN | 102110309 A | 6/2011 |
| JP | 2013-188440 A | 9/2013 |
| JP | 2015126927 A | 7/2015 |
| WO | 2004104939 A1 | 12/2004 |
| WO | 2006000925 A2 | 1/2006 |
| WO | 2013010261 A2 | 1/2013 |

OTHER PUBLICATIONS

Yao Demin et al., "Research of the Key Technique in Virtual Endoscopy and Its Clinical Application," Journal of Biomedical Engineering, Feb. 28, 2008; vol. 25 No. 1, pp. 18-22, with English-language Abstract.

Tian Jun et al.,"The Projection Models and Algorithms of Panorama," Computer Systems & Applications, Dec. 31, 2013; vol. 22 No. 5, pp. 126-132, 192, with English-language Abstract.

Florez-Valencia, Leonardo, et al., "3D models for vascular lumen segmentation in MRA images and for artery-stenting simulation," Ingenierie et Recherche Biomedicale (ITBM-RBM) Dec. 31, 2007; vol. 28 No. 2, pp. 65-71.

State Intellectual Property Office of the People's Republic of China; Office action mailed in corresponding Chinese Application No. 201510738560.1 dated Jun. 27, 2017, with partial English-language translation.

Paik D S et al, "Visualization Modes for CT Colonography Using Cylindrical and Planar Map Projections", Journal of Computer Assisted Tomography, New York, NY, US, vol. 24, No. 2, Jan. 2000 (Jan. 1, 2000), pp. 179-188, XP008014184, DOI: 10.1097/00004728-200003000-00001.

Christopher F Beaulieu et al, "Advanced 3D Display Methods", Atlas of Virtual Colonoscopy, Jan. 1, 2003 (Jan. 1, 2003), pp. 37-44, XP055164835, Retrieved from the Internet: URL:http ://eknygos.1smuni. It/springer/170 /53-64.pdf.

Ronald M. Summers, "Improving the Accuracy o f CTC Interpretation : Computer-Aided Detection", Gastrointestinal Endoscopy Clinics of North America, vol. 20, No. 2, Apr. 1, 2010 (Apr. 1, 2010), pp. 245-257, XP055141752, ISSN: 1052-5157, DOI: 10.1016/J. giec .2010.02.004 * Chapter: Innovative Displays for CTC; p. 7.

Extended European search report dated Feb. 22, 2017 in corresponding CN Application No. 16191325.6.

* cited by examiner

RENDERING EXPANDED LUMEN IMAGE

CROSS REFERENCE TO RELATED APPLICATIONS

This application claims priority under 35 U.S.C. § 119 to Chinese Patent Application No. 2015107385601, filed on Nov. 3, 2015. The content of the priority application is hereby incorporated by reference in its entirety.

TECHNICAL FIELD

The present disclosure relates to rendering an expanded lumen image in the field of medical imaging technologies.

BACKGROUND

With the emergence of medical imaging devices, such as Computer Tomography (CT), Magnetic-Resonance Imaging (MRI), Positron Emission Tomography (PET) or the like, and the development of computer graphics, digital image processing technologies, visualization technologies and virtual reality technologies or the like, as a non-intrusive examination manner, virtual endoscopy is increasingly widely used. By means of medical imaging devices, such as CT, MRI, PET and so on, for obtaining a human body's two-dimensional slicing data, and by virtue of digital image processing technologies, scientific visualization technologies and virtual reality technologies or the like for processing the obtained data, the virtual endoscopy may generate three-dimensional images of a human body's lumens such as colons, blood vessels, tracheas and oesophaguses and simulate a traditional medical endoscope to perform an endoscopic examination on a patient.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

This present disclosure is directed to rendering an expanded lumen image. In general, one innovative aspect of the subject matter described in this specification can be embodied in methods that include the actions of obtaining a plurality of viewpoints by sampling a centre line of a lumen based on a three-dimensional lumen image; establishing a spherical projection plane for each of the viewpoints, wherein a point on the spherical projection plane corresponds to a point on an inner wall of the lumen; determining a relationship between a two-dimensional projection plane and the inner wall of the lumen according to a corresponding relationship between the spherical projection plane and the two-dimensional projection plane; and obtaining a two-dimensional expanded image of the three-dimensional lumen image by performing image rendering on the two-dimensional projection plane according to the determined relationship between the two-dimensional projection plane and the inner wall of the lumen.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. For instance, establishing a spherical projection plane for each of the viewpoints can include: determining a gazing direction and a local coordinate system of the viewpoint, wherein a Z-axis direction of the local coordinate system is the gazing direction of the viewpoint; and establishing the spherical projection plane by taking the viewpoint as a centre of sphere and R as a radius under the local coordinate system, wherein R is a preset radius value less than or equal to a radius of the inner wall of the lumen.

In some implementations, determining a gazing direction and a local coordinate system of a viewpoint comprises: determining a gazing direction of a current viewpoint according to positions of viewpoints adjacent to the current viewpoint on the centre line; and determining an X-axis direction, a Y-axis direction and a Z-axis direction of a local coordinate system of the current viewpoint according to a connecting line between a previous viewpoint before the current viewpoint and the current viewpoint and a local coordinate system of the previous viewpoint.

The point on the spherical projection plane corresponding to the point on the inner wall of the lumen can include: a first point on the spherical projection plane corresponding to a second point on the inner wall of the lumen directed by a three-dimensional vector of the first point, wherein the three-dimensional vector of the first point is a vector constituted by the first point and a centre of sphere of the spherical projection plane.

The corresponding relationship between the spherical projection plane and the two-dimensional projection plane can include: a corresponding relationship between a three-dimensional vector of the first point on the spherical projection plane and a two-dimensional coordinate of a third point on the two-dimensional projection plane. Determining a relationship between a two-dimensional projection plane and the inner wall of the lumen can include: dividing the spherical projection plane into a plurality of three-dimensional regions; determining an image rending region of the two-dimensional projection plane, the image rending region comprising a plurality of two-dimensional regions respectively corresponding to the plurality of three-dimensional regions of the spherical projection plane; and determining a three-dimensional vector on one of the three-dimensional regions corresponding to a point on one of the two-dimensional regions.

In some cases, the plurality of three-dimensional regions includes: a three-dimensional region R1, which is a spherical surface positioned between an X-axis positive direction and a Z-axis negative direction, a three-dimensional region R2, which is a spherical surface positioned in an X-axis negative direction, and a three-dimensional region R3, which is a spherical surface excluding the three-dimensional regions R1 and R2. And the image rendering region can include: a two-dimensional region R1' corresponding to the three-dimensional region R1, which is a semicircle with radius equal to a scaled lumen radius r and positioned on a left side of the image rendering region, the scaled lumen radius r being obtained by multiplying a radius of the inner wall of the lumen with a preset scaling ratio, a two-dimensional region R2' corresponding to the three-dimensional region R2, which is a rectangle with width equal to πr and height equal to 2 r and positioned in a middle part of the image rendering region, and a two-dimensional region R3' corresponding to the three-dimensional region R3, which is a semicircle with radius equal to the scaled lumen radius r and positioned on a right side of the image rendering region.

Obtaining a two-dimensional expanded image of the three-dimensional lumen image can include: obtaining color information of the second point on the inner wall of the lumen directed by a three-dimensional vector corresponding to the third point on the two-dimensional projection plane; and obtaining a two-dimensional expanded image of the three-dimensional lumen image by performing image rendering on the two-dimensional projection plane based on the obtained color information.

The details of one or more embodiments of the subject matter described in the present disclosure are set forth in the accompanying drawings and description below. Other features, aspects, and advantages of the subject matter will become apparent from the description, the drawings, and the claims.

BRIEF DESCRIPTION OF DRAWINGS

Features of the present disclosure are illustrated by way of example and not limited in the following figures, in which like numerals indicate like elements, in which.

DETAILED DESCRIPTION

With the development of medical imaging devices such as CT, MRI and PET and medical imageology, as a non-intrusive examination manner, virtual endoscopy is increasingly widely used. A virtual endoscopy may simulate an endoscope to display intracavitary morphology of cavity organs, such as colons, tracheas, blood vessels and oesophaguses, stereoscopically from a view angle within the cavities by utilizing a computer three-dimensional reconstruction function, and simulate an endoscopic examination process by using lumen navigation technologies or roaming technologies.

In the following, the present disclosure presents a method of rendering an expanded lumen image, which enables to intuitively and effectively display a lumen. It is to be noted that by using the method of rendering an expanded lumen image presented by the present disclosure, a lumen image in a three-dimensional medical image may be expanded to be a two-dimensional image for rendering. In practical applications, the three-dimensional medical image may include a three-dimensional CT image, a three-dimensional PET image, a three-dimensional MRI image and so on, which are not limited in examples of the present disclosure.

Figure 1A:
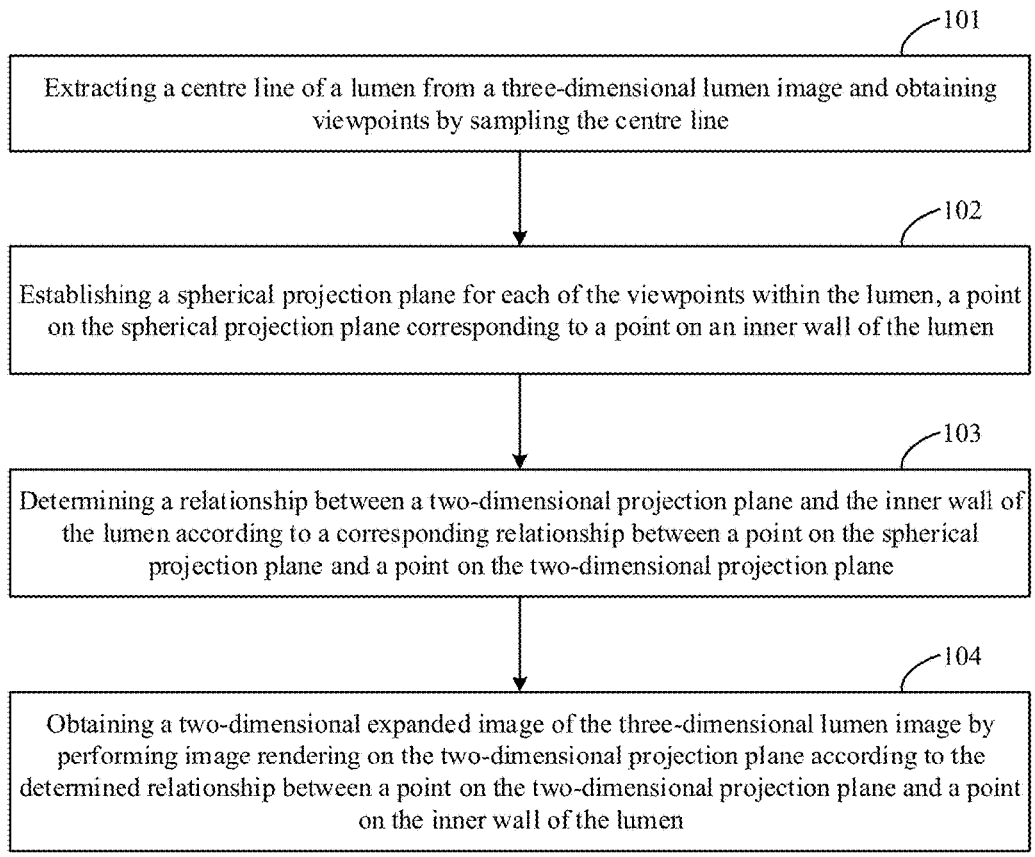
FIG. 1A illustrates a flowchart of a method of rendering an expanded lumen image according to an example of the present disclosure.

FIG. 1A illustrates a flowchart of a method of rendering an expanded lumen image according to an example of the present disclosure, the method may include following blocks.

At block 101, a centre line of a lumen may be extracted from a three-dimensional lumen image, and viewpoints may be obtained by sampling the centre line.

In an example of the present disclosure, the centre line of a lumen may be manually extracted from a three-dimensional lumen image.

In another example of the present disclosure, the centre line of a lumen may be automatically extracted from a three-dimensional lumen image. Specifically, the centre line of a lumen may be extracted from a three-dimensional lumen image by using a distance transform iteration method or a skeletonization method. Of course, other methods in related technologies may also be used to extract the centre line of a lumen, which are not limited in the present disclosure.

After the centre line of the three-dimensional lumen image is obtained, viewpoints may be obtained by sampling the centre line. A sampling point can be a viewpoint.

In an example of the present disclosure, the centre line may be uniformly sampled. In practical application, the quantity of viewpoints may be adjusted by setting up a sampling interval. For example, a smaller sampling interval may be set up when more viewpoints are needed; whereas a larger sampling interval may be set up when fewer viewpoints are needed.

In another example of the present disclosure, the centre line may be non-uniformly sampled.

At block 102, a spherical projection plane may be established for each of the viewpoints within the lumen. A point on the spherical projection plane may correspond to a point on an inner wall of the lumen of the three-dimensional lumen image.

Figure 2:
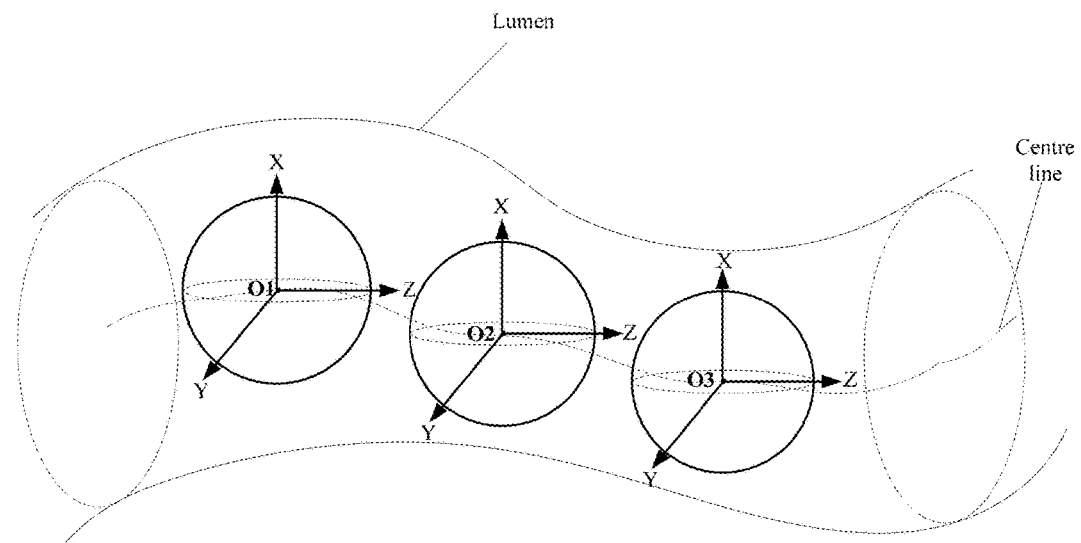
FIG. 2 illustrates an exemplary diagram of a relationship between a lumen and a spherical projection plane according to an example of the present disclosure.

It is to be noted that a spherical projection plane of each of the viewpoints within the lumen may be positioned inside the lumen, as shown in FIG. 2, so as to ensure that each point on the inner wall of the lumen, where a current viewpoint is, may correspond to a point on the spherical projection plane. In addition, for ease of description, a viewpoint for which a lumen image needs to be expanded currently may be described as a current viewpoint in this example.

Figure 1B:
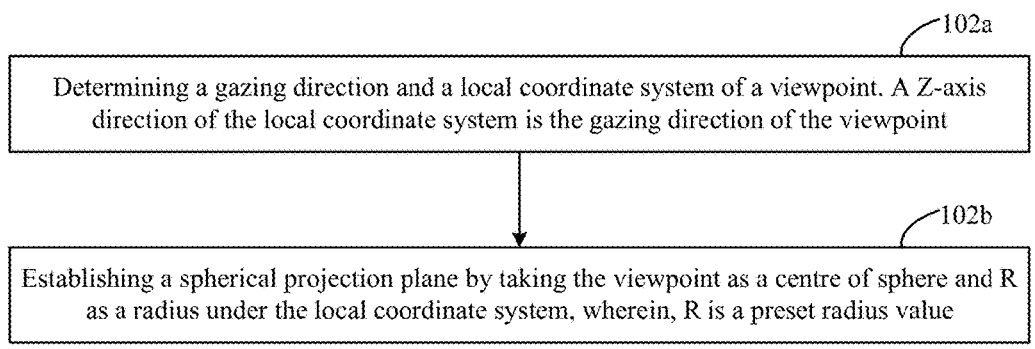
FIG. 1B illustrates a flowchart of block 102 as shown in FIG. 1A according to an example of the present disclosure.

In an example of the present disclosure, as shown in FIG. 1B, the foregoing block 102 may include blocks 102a and 102b.

At block 102a, a gazing direction and a local coordinate system of a viewpoint may be determined. A Z-axis direction of the local coordinate system is the gazing direction of the viewpoint.

In this example, a gazing direction of a current viewpoint may be determined according to positions of viewpoints adjacent to the current viewpoint on the centre line, e.g., positions of viewpoints immediately before and after the current viewpoint on the centre line. Specifically, the gazing direction of the current viewpoint may be determined by performing a positional differential operation on positions of viewpoints adjacent to the current viewpoint on the centre line, e.g., positions of viewpoints immediately before and after the current viewpoint on the centre line.

In this example, when a local coordinate system of the current viewpoint is established, an X-axis direction, a Y-axis direction and a Z-axis direction of the local coordinate system of the current viewpoint may be determined according to a connecting line between a previous viewpoint, e.g., immediately, before the current viewpoint, and the current viewpoint and the local coordinate system of the previous viewpoint.

At block 102b, a spherical projection plane by taking the viewpoint as a centre of sphere and R as a radius may be established under the local coordinate system. R is a preset radius value less than or equal to a radius R0 of the inner wall of the lumen, that is, R<=R0.

It is to be noted that a three-dimensional lumen image generated according to virtual endoscopy, a human eye may make a roaming observation within the virtual internal cavity along a certain path to simulate a traditional endoscope examination process. In this example, the centre line of the lumen may be taken as a roaming path for the human eye to make a roaming observation, and a viewpoint on the centre line of the lumen may be taken as a roaming viewpoint of the human eye.

Figure 3:
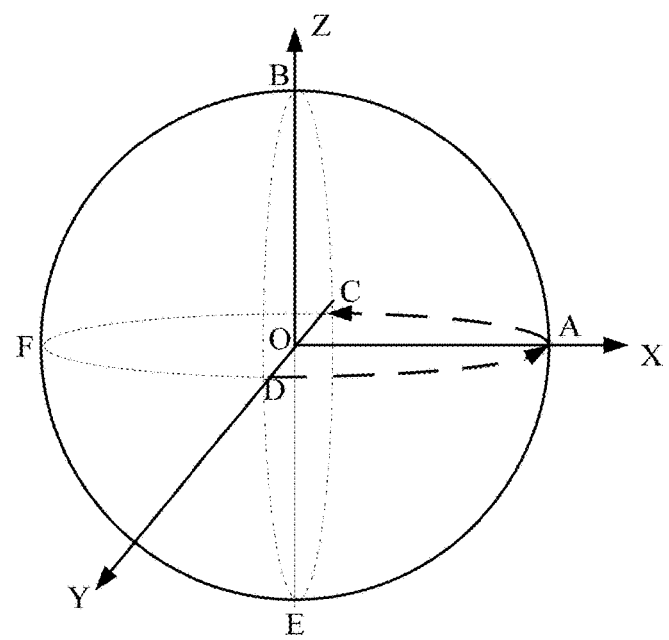
FIG. 3 illustrates an exemplary diagram of a spherical projection plane according to an example of the present disclosure.

The spherical projection plane as shown in FIG. 3 may be established under the local coordinate system obtained at block 102a. The spherical projection plane may take the roaming viewpoint of the human eye as a centre of sphere O, and a preset radius value R as a radius. OX, OY and OZ may constitute an orthogonal Cartesian coordinate system. The OZ may be understood as a straight ahead direction of the viewpoint, i.e., the gazing direction of the viewpoint; and an OXY plane is perpendicular to the OZ direction. In FIG. 3, an intersection point of a spherical surface that takes the point O as a centre of sphere and a distance R as a spherical radius and a positive direction of the OX axis is A, an intersection point of the spherical surface and a positive direction of the OY axis is D, an intersection point of the spherical surface and a positive direction of the OZ axis is B, an intersection point of the spherical surface and a negative direction of the OX axis is F, an intersection point of the spherical surface and a negative direction of the OZ axis is E, and an intersection point of the spherical surface and a negative direction of the OY axis is C. A projection direction may be determined by a vector constituted by the centre of sphere point O and any point on the spherical surface, and the spherical surface may be referred to as a projection plane.

It is to be noted that R in this example may be an empirical value for those skilled in the art, which of course may also be set up according to an actual situation, and is not limited in this example.

Referring back to FIG. 1A, at block 103, a corresponding relationship between a point on a two-dimensional projection plane and a point on the inner wall of the lumen may be determined according to a corresponding relationship between a point on the spherical projection plane and a point on the two-dimensional projection plane.

Figure 4:
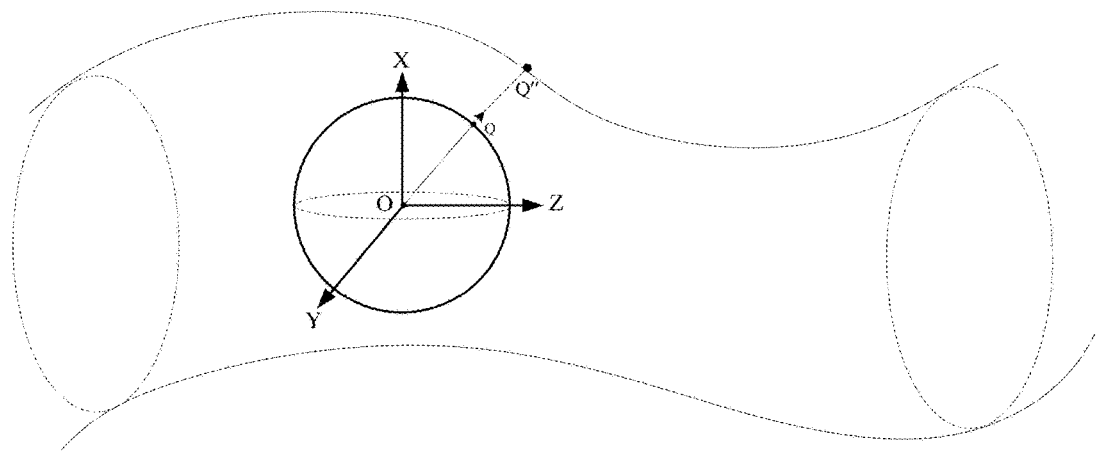
FIG. 4 illustrates an exemplary diagram of a corresponding relationship between a point on a spherical projection plane and a point on an inner wall of a lumen according to an example of the present disclosure.

In an example of the present disclosure, a point on the spherical projection plane corresponding to a point on the inner wall of the lumen may include: a three-dimensional vector of a first point on the spherical projection plane corresponding to a second point on the inner wall of the lumen directed by the three-dimensional vector on the three-dimensional lumen image. Correspondingly, a corresponding relationship between the first point on the spherical projection plane and a third point on the two-dimensional projection plane may include: a corresponding relationship between the three-dimensional vector of the first point on the spherical projection plane and a two-dimensional coordinate of the third point on the two-dimensional projection plane. The three-dimensional vector of the first point on the spherical projection plane may be a vector constituted by the first point and the centre of sphere, as illustrated in FIG. 4, the direction of the first point Q on the spherical projection plane may direct toward the second point Q" on the inner wall of the lumen of the three-dimensional lumen image.

Specifically, in this example, a method of establishing the corresponding relationship between the three-dimensional vector of the first point on the spherical projection plane and the two-dimensional coordinate of the third point on the two-dimensional projection plane may include the following three steps.

Figure 5A:
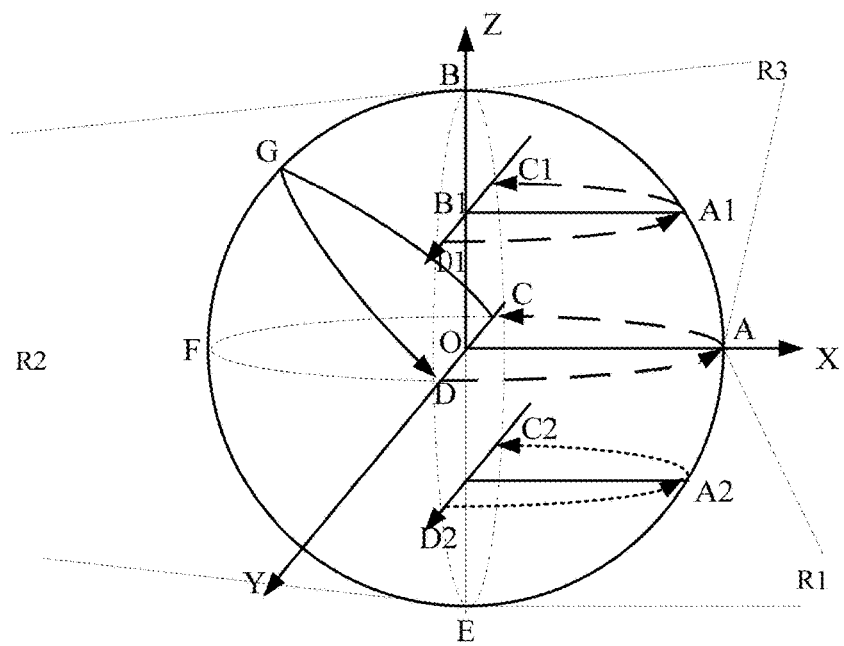
FIG. 5A illustrates another exemplary diagram of a spherical projection plane according to an example of the present disclosure.
Figure 5B:
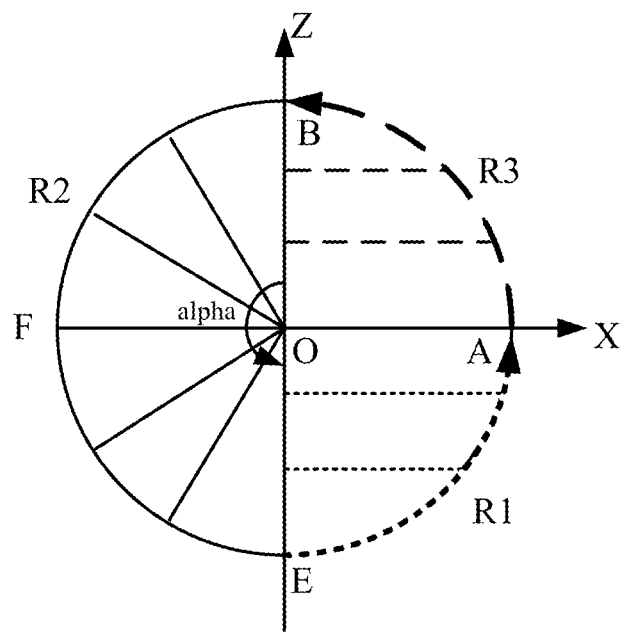
FIG. 5B illustrates an exemplary diagram of a spherical region corresponding to the spherical projection plane as shown in FIG. 5A according to an example of the present disclosure.

At the first step, a plurality of three-dimensional regions, e.g., three three-dimensional regions, may be obtained by performing a regional division on the spherical projection plane. For example, a spherical surface positioned between X-axis positive direction and the Z-axis negative direction on the spherical projection plane may be taken as a three-dimensional region R1, a spherical surface positioned in the X axis negative direction may be taken as a three-dimensional region R2, and the residual spherical surface, i.e., a spherical surface positioned between X-axis positive direction and the Z-axis positive direction on the spherical projection plane, may be taken as a three-dimensional region R3. The three three-dimensional regions R1, R2 and R3 may be obtained by performing the foregoing regional division on the spherical projection plane as shown in FIG. 5A. To describe the regional division, the OXZ plane in FIG. 5A may be taken as an example, as shown in FIG. 5B, a circle generated by cutting the spherical surface by the plane includes three parts: an arc EA belonging to the three-dimensional region R1, an arc BFE belonging to the three-dimensional region R2, and an arc AB belonging to the three-dimensional region R3. A method of sampling viewpoints within the three-dimensional regions R1 and R3 may be determined by an arc generated by cutting the spherical surface by a plane parallel to the OXY plane. A method of sampling viewpoints within the three-dimensional region R2 may be understood that viewpoints are generated because the arc CFD rotates around the OY axis within the three-dimensional region R2. An arc CAD on a critical plane of the three-dimensional regions R1 and R3 may correspond to the arc CAD on the spherical surface in FIG. 5A.

Figure 5C:
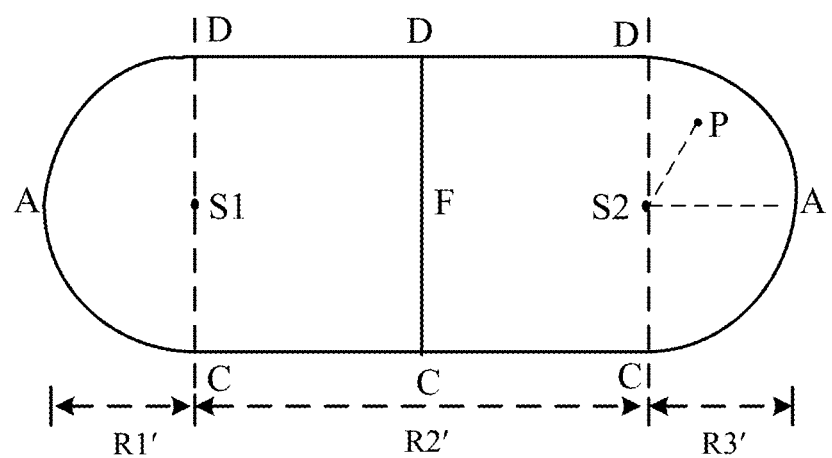
FIG. 5C illustrates an exemplary diagram of an expanded image corresponding to the spherical projection plane as shown in FIG. 5A according to an example of the present disclosure.

At the second step, an image rendering region of the two-dimensional projection plane may be determined, wherein the image rendering region may be composed of a plurality of two-dimensional regions, e.g., three two-dimensional regions R1', R2' and R3', as shown in FIG. 5C. The two-dimensional regions R1', R2' and R3' may respectively correspond to the three-dimensional regions R1, R2 and R3. The two-dimensional region R2' may be a rectangle whose width is nr and height is 2 r, and positioned in a middle part of the image rendering region. The two-dimensional regions R1' and R3' may be semicircles whose radius is equal to a scaled lumen radius r, and respectively positioned on left and right sides of the two-dimensional region R2', and may render expanded lumen wall images along two directions before and after the lumen. The scaled lumen radius r may be obtained by multiplying the radius R0 of the inner wall of the lumen with a preset scaling ratio k (e.g., k<=1). The scaling ratio may be determined according to a desirable image size. For example, when the scaling ratio is 1, the scaled lumen radius r may be equal to the radius R0 of the inner wall of the lumen; when the scaling ratio is 0.5, the scaled lumen radius r may be equal to a half of the radius R0 of the inner wall of the lumen; and so on. The scaled lumen radius r may be less than or identical to the radius R of the spherical projection plane. The image rendering region of the two-dimensional projection plane may be as shown in FIG. 5C, an S1 point and an S2 point are centres of semicircles, both of which may correspond to the point O within a spherical coordinate graph, and a corresponding three-dimensional vector may be determined for each point P within the image rendering region.

It is to be noted that in this example, based on one viewpoint within the lumen, a section of expanded lumen image positioned around the viewpoint instead of the whole expanded lumen image may be rendered.

At the third step, a three-dimensional vector ($L_{R3}$, $M_{R3}$, $N_{R3}$) of a point on the three-dimensional region R3 of the spherical projection plane corresponding to a point P (x, y) on the two-dimensional region R3' of the two-dimensional projection plane may be determined. (xc, yc) is a coordinate of a centre of circle S2 of the two-dimensional region R3', (X1, Y1, Z1), (X2, Y2, Z2) and (X3, Y3, Z3) respectively are unit vectors of the X axis, the Y axis and the Z axis, wherein $L_{R3}=Xi_{R3}*X1+Yi_{R3}*X2+Zi_{R3}*X3$, $M_{R3}=Xi_{R3}*Y1+Yi_{R3}*Y2+Zi_{R3}*Y3$, $N_{R3}=Xi_{R3}*Z1+Yi_{R3}*Z2+Zi_{R3}*Z3$, $Xi_{R3}=i_{R3}/\sqrt{i_{R3}*i_{R3}+j_{R3}*j_{R3}+k_{R3}*k_{R3}}$, $Yi_{R3}=j_{R3}/\sqrt{i_{R3}*i_{R3}+j_{R3}*j_{R3}+k_{R3}*k_{R3}}$, $Zi_{R3}=k_{R3}/\sqrt{i_{R3}*i_{R3}+j_{R3}*j_{R3}+k_{R3}*k_{R3}}$, $i_{R3}=(x-xc)*r*\sin(\sqrt{(x-xc)^2+(y-yc)^2}/r)$, $j_{R3}=(y-yc)*r*\sin(\sqrt{(x-xc)^2+(y-yc)^2}/r)$, $k_{R3}=r*\cos(\sqrt{(x-xc)^2+(y-yc)^2}/r)$, ($i_{R3}$, $j_{R3}$, $k_{R3}$) is a spherical point coordinate corresponding to the point P (x, y) on the two-dimensional region R3'.

A three-dimensional vector ($L_{R1}$, $M_{R1}$, $N_{R1}$) of a point on the three-dimensional region R1 of the spherical projection plane corresponding to a point P (x, y) on the two-dimensional region R1' of the two-dimensional projection plane may be determined. (xd, yd) is a coordinate of a centre of circle S1 of the two-dimensional region R1', wherein $L_{R1}=Xi_{R1}*X1+Yi_{R1}*X2+Zi_{R1}*X3$, $M_{R1}=Xi_{R1}*Y1+Yi_{R1}*Y2+Zi_{R1}*Y3$, $N_{R1}=Xi_{R1}*Z1+Yi_{R1}*Z2+Zi_{R1}*Z3$, $Xi_{R1}=i_{R1}/\sqrt{i_{R1}*i_{R1}+j_{R1}*j_{R1}+k_{R1}*k_{R1}}$, $Yi_{R1}=j_{R1}/\sqrt{i_{R1}*i_{R1}+j_{R1}*j_{R1}+k_{R1}*k_{R1}}$, $Zi_{R1}=k_{R1}/\sqrt{i_{R1}*i_{R1}+j_{R1}*j_{R1}+k_{R1}*k_{R1}}$, $i_{R1}=(x-xd)*r*\sin(\sqrt{(x-xd)^2+(y-yd)^2}/r)$, $j_{R1}=(y-yd)*r*\sin(\sqrt{(x-xd)^2+(y-yd)^2}/r)$, $k_{R1}=r*\cos(\sqrt{(x-xd)^2+(y-yd)^2}/r)$, ($i_{R1}$, $j_{R1}$, $k_{R1}$) is a spherical point coordinate corresponding to the point P (x, y) on the two-dimensional region R1'.

A three-dimensional vector ($L_{R2}$, $M_{R2}$, $N_{R2}$) of a point on the three-dimensional region R2 of the spherical projection plane corresponding to a point P (x, y) on the two-dimensional region R2' of the two-dimensional projection plane may be determined, wherein $L_{R2}=Xi_{R2}*X1+Yi_{R2}*X2+Zi_{R2}*X3$, $M_{R2}=Xi_{R2}*Y1+Yi_{R2}*Y2+Zi_{R2}*Y3$, $N_{R2}=Xi_{R2}*Z1+Yi_{R2}*Z2+Zi_{R2}*Z3$, $Xi_{R2}=i_{R2}/\sqrt{i_{R2}*i_{R2}+j_{R2}*j_{R2}+k_{R2}*k_{R2}}$, $Yi_{R2}=j_{R2}/\sqrt{i_{R2}*i_{R2}+j_{R2}*j_{R2}+k_{R2}*k_{R2}}$, $Zi_{R2}=k_{R2}/\sqrt{i_{R2}*i_{R2}+j_{R2}*j_{R2}+k_{R2}*k_{R2}}$, $i_{R2}=-\cos(beta)*\sin(alpha)$, $j_{R2}=-\sin(beta)$, $k_{R2}=-\cos(beta)*\cos(alpha)$, $alpha=(x-xd)*\pi/(xc-xd)$, $beta=-(y-yd)*\pi/(2*r)$, ($i_{R2}$, $j_{R2}$, $k_{R2}$) is a spherical point coordinate corresponding to the point P (x, y) on the two-dimensional region R2'.

It is to be noted that, to implement a two-dimensional expanded image, a reasonable scaled lumen radius r and coordinates of points S1 and S2 may be first determined according to given width and height of the three-dimensional lumen image, e.g., according to a radius R0 of the inner wall of the lumen. The scaled lumen radius r can be determined by multiplying the radius R0 with a scaling ratio k (e.g., k<=1). Then, a radius R of the spherical projection plane is determined based on the scaled lumen radius r. The radius R may be greater than or identical to the scaled lumen radius r, i.e., R>=r. In some cases, the radius R is also determined based on the radius R0 of the inner wall of the lumen, e.g., R<=R0. In a particular example, r<=R<=R0. Subsequently, coordinates of points within the two-dimensional regions R1', R2' and R3' of the two-dimensional projection plane may be determined based on coordinates of corresponding points within three-dimensional regions R1, R2 and R3 of the spherical projection plane. In some cases, points beyond the two-dimensional regions may be not calculated.

Referring back to FIG. 1A, at block 104, a two-dimensional expanded image of the three-dimensional lumen image may be obtained by performing image rendering on the two-dimensional projection plane according to the corresponding relationship between a point on the two-dimensional projection plane and a point on the inner wall of the lumen.

Figure 5D:
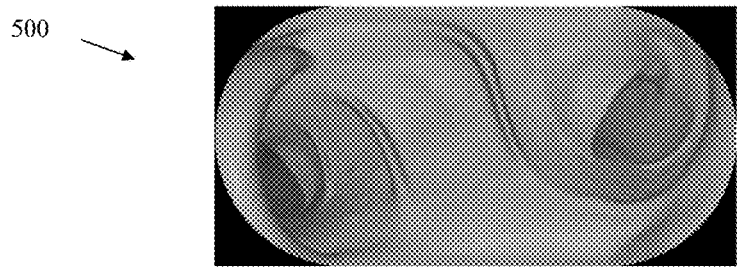
FIG. 5D illustrates an exemplary diagram of an expanded image of a normal colon according to an example of the present disclosure.
Figure 5E:
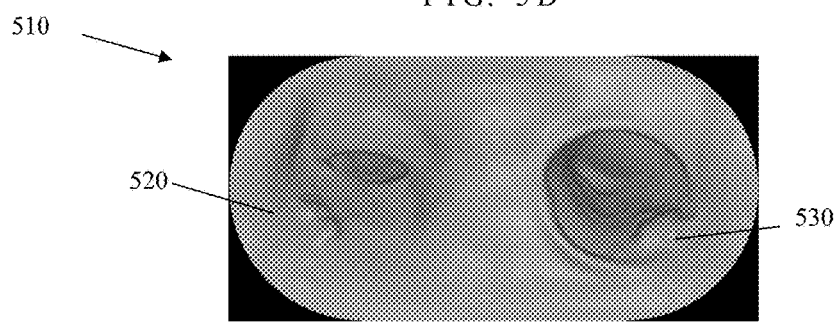
FIG. 5E illustrates an exemplary diagram of an expanded image of a colon having polyps according to an example of the present disclosure.

To render an expanded lumen image for one viewpoint, target color of each point within the image rendering region on the two-dimensional projection plane may be obtained according to the corresponding relationship among the viewpoint, a point on the two-dimensional projection plane and a point on the inner wall of the lumen of the three-dimensional lumen image as well as ray casting technologies. Target color may be color of each pixel point on the inner wall of the lumen directed by a direction of a three-dimensional projection vector corresponding to a point within the image rendering region. Afterward, a two-dimensional expanded image of the three-dimensional lumen image may be obtained finally by performing image rendering on the two-dimensional projection plane based on the obtained target color by using image rendering technologies such as three-dimensional volume reconstruction, maximum intensity projection or three-dimensional surface reconstruction. For example, FIG. 5D shows an expanded two-dimensional image 500 of a normal colon, and FIG. 5E shows an expanded image 510 of a colon having polyps, wherein an expanded two-dimensional image 510 may clearly display the polyps 520 and 530. In addition, the expanded image in this example is coherent in tissue structure, wide in view angle (e.g., expanded with 360 degrees), small in deformation, rotatable at any angle based on a current position, suitable for intraluminal observation, and applicable to blood vessels, tracheas and oesophaguses besides colons.

As can be seen from the foregoing example, the three-dimensional lumen image may be expanded to be a two-dimensional plane image for rendering. Rendering a two-dimensional expanded lumen image may include information of a virtual roaming position in 360 degrees, relatively intuitively display information on a lumen along two directions before and after the lumen at the virtual roaming position, and have the advantages of continuous image information and small deformation, thereby providing convenience for a doctor to make an observation and diagnosis.

Corresponding to the example of the foregoing method of rendering an expanded lumen image, the present disclosure further provides an example of a device for rendering an expanded lumen image.

Figure 6:
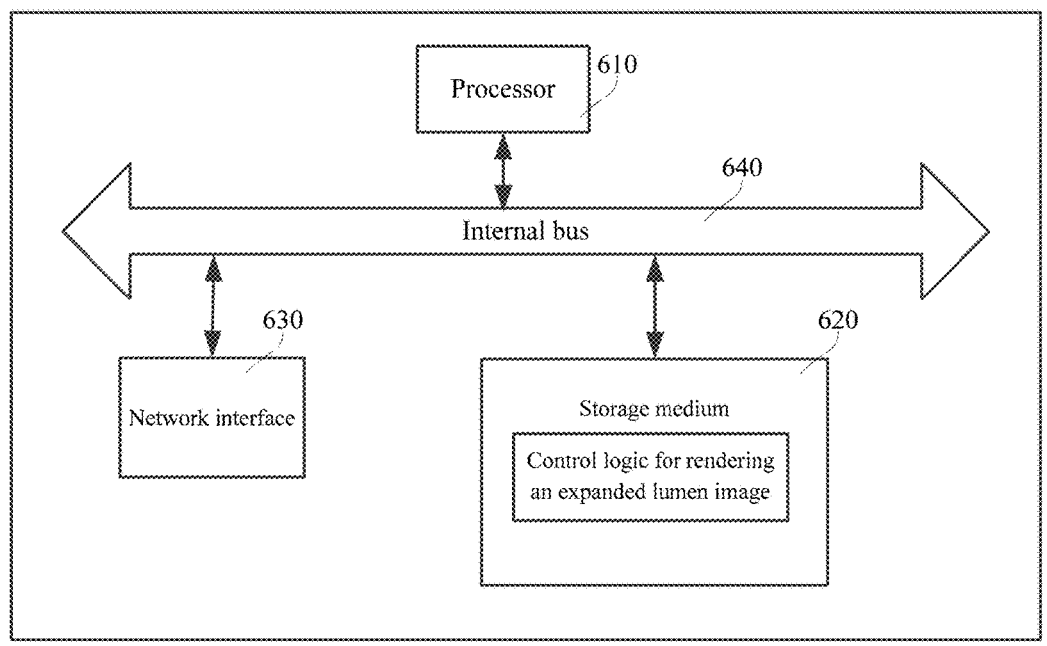
FIG. 6 illustrates a hardware structure diagram of a device for rendering an expanded lumen image according to an example of the present disclosure.

Rendering an expanded lumen image provided by the present disclosure may be executed by a control device as shown in FIG. 6. The control device may include a processor 610, a storage medium 620, a network interface 630 and a bus 640, wherein communications among the processor 610, the storage medium 620 and the network interface 630 may be achieved through the bus 640.

In different examples, the storage medium 620 may be a Random Access Memory (RAM), a volatile memory, a nonvolatile memory, a flash memory, a memory drive (such as a hard disk drive), a solid state drive, any type of memory disks (such as an optical disk or a DVD and so on), or a similar storage medium, or a combination thereof.

Figure 7:
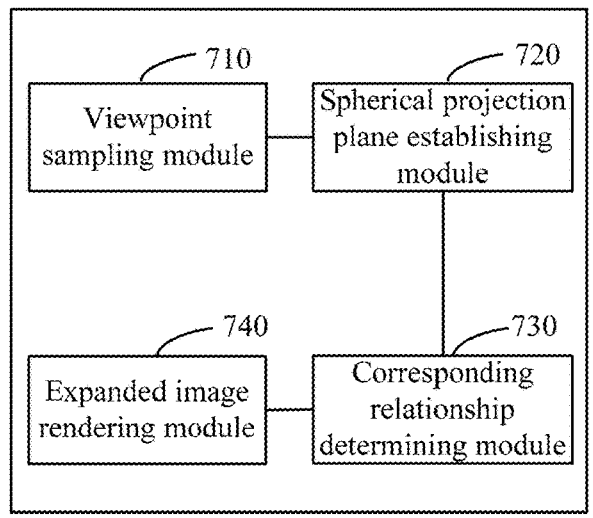
FIG. 7 schematically illustrates a diagram of functional modules of a control logic for rendering an expanded lumen image according to an example of the present disclosure.

Further, the storage medium 620 may be used to store machine readable instructions corresponding to a control logic for rendering an expanded lumen image. Functionally divided, as shown in FIG. 7, the control logic may include:

a viewpoint sampling module 710 may be used to extract a centre line of a lumen from a three-dimensional lumen image, and sample the centre line to obtain viewpoints;

a spherical projection plane establishing module 720 may be used to establish a spherical projection plane for each of the viewpoints within the lumen, wherein a point on the spherical projection plane may correspond to a point on an inner wall of the lumen, and a radius of the spherical projection plane may be less than or equal to that of the inner wall of the lumen;

a corresponding relationship determining module 730 may be used to determine a corresponding relationship between a point on a two-dimensional projection plane and a point on the inner wall of the lumen according to a corresponding relationship between a point on the established spherical projection plane and a point on the two-dimensional projection plane; and an expanded image rendering module 740 may be used to perform image rendering on the two-dimensional projection plane according to the corresponding relationship between a point on the two-dimensional projection plane and a point on the inner wall of the lumen to obtain a two-dimensional expanded image of the three-dimensional lumen image.

Figure 8:
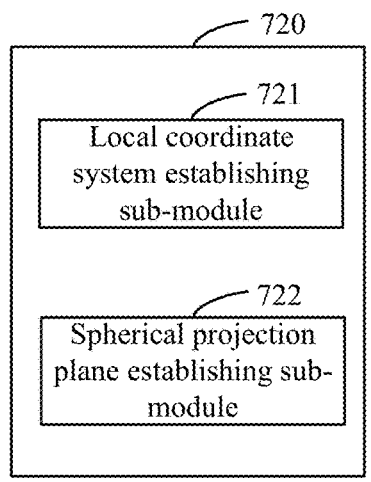
FIG. 8 schematically illustrates a constitutional diagram of a spherical projection plane establishing module of a control logic for rendering an expanded lumen image according to an example of the present disclosure.

Further, as shown in FIG. 8, the spherical projection plane establishing module 720 may specifically include:

a local coordinate system establishing sub-module 721 may be used to determine a gazing direction and a local coordinate system of a viewpoint, wherein a Z-axis direction of the local coordinate system is the gazing direction of the viewpoint; and a spherical projection plane establishing sub-module 722 may be used to establish a spherical projection plane by taking the viewpoint as a centre of sphere and R as a radius under the local coordinate system, wherein R is a preset radius value less than or equal to a radius of the inner wall of the lumen.

Figure 9:
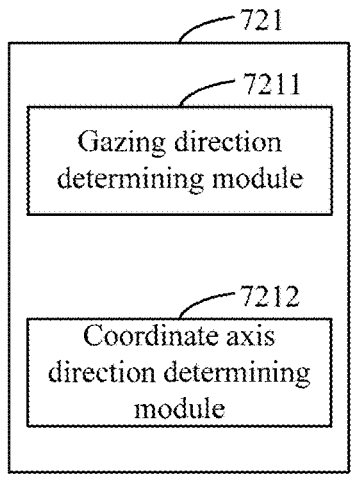
FIG. 9 schematically illustrates a constitutional diagram of a local coordinate system establishing sub-module of a control logic for rendering an expanded lumen image according to an example of the present disclosure.

Further, as shown in FIG. 9, the local coordinate system establishing sub-module 721 may specifically include:

a gazing direction determining module 7211 may be used to determine a gazing direction of a current viewpoint according to positions of viewpoints adjacent to the current viewpoint, e.g., immediately before and after the current viewpoint, on the centre line; and a coordinate axis direction determining module 7212 may be used to determine an X-axis direction, a Y-axis direction and a Z-axis direction of a local coordinate system of the current viewpoint according to a connecting line between a previous viewpoint, e.g., immediately, before the current viewpoint, and the current viewpoint and a local coordinate system of the previous viewpoint.

In another example of the present disclosure, a corresponding relationship between a point on the spherical projection plane and a point on the two-dimensional projection plane may include: a corresponding relationship between a three-dimensional vector of the point on the spherical projection plane and a two-dimensional coordinate of the point on the two-dimensional projection plane, wherein the three-dimensional vector of the point on the spherical projection plane may be a vector constituted by the point on the spherical projection plane and the centre of sphere.

A point on the spherical projection plane corresponding to a point on the inner wall of the lumen may include: the three-dimensional vector of the point on the spherical projection plane corresponding to the point on the inner wall of the lumen directed by the direction of the vector.

In another example of the present disclosure, by reading machine readable instructions in the storage medium 620 corresponding to the control logic for rendering an expanded lumen image, the machine readable instructions further cause the processor 610 to:

take a spherical surface positioned between a positive direction of an X axis and a negative direction of a Z axis on the spherical projection plane as a three-dimensional region R1, a spherical surface in the negative direction of the X axis as a three-dimensional region R2, and the residual spherical surface as a three-dimensional region R3;

determine an image rendering region of a two-dimensional projection plane, which includes two-dimensional regions R1', R2' and R3', wherein the two-dimensional regions R1', R2' and R3' may respectively correspond to the three-dimensional regions R1, R2 and R3, the two-dimensional region R1' and R3' are semicircles whose radius is equal to a scaled lumen radius r, the two-dimensional region R2' is a rectangle whose width is πr and height is 2 r and positioned in a middle part of the image rendering region, and the two-dimensional region R1' and R3' are respectively positioned on left and right sides of the two-dimensional regions R2'; the scaled lumen radius r may be obtained by multiplying the radius R0 of the inner wall of the lumen with a preset scaling ratio, determine a three-dimensional vector $(L_{R3}, M_{R3}, N_{R3})$ of a point on the three-dimensional region R3 corresponding to a point P (x, y) on the two-dimensional region R3', wherein (xc, yc) is a coordinate of a centre of circle of the two-dimensional region R3', (X1, Y1, Z1), (X2, Y2, Z2) and (X3, Y3, Z3) respectively are unit vectors of the X axis, the Y axis and the Z axis, $L_{R3}=Xi_{R3}*X1+Yi_{R3}*X2+Zi_{R3}*X3$, $M_{R3}=Xi_{R3}*Y1+Yi_{R3}*Y2+Zi_{R3}*Y3$, $N_{R3}=Xi_{R3}*Z1+Yi_{R3}*Z2+Zi_{R3}*Z3$, $Xi_{R3}=i_{R3}/\sqrt{i_{R3}*i_{R3}+j_{R3}*j_{R3}+k_{R3}*k_{R3}}$, $Yi_{R3}=j_{R3}/\sqrt{i_{R3}*i_{R3}+j_{R3}*j_{R3}+k_{R3}*k_{R3}}$, $Zi_{R3}=k_{R3}/\sqrt{i_{R3}*i_{R3}+j_{R3}*j_{R3}+k_{R3}*k_{R3}}$, $i_{R3}=(x-xc)*r*\sin(\sqrt{(x-xc)^2+(y-yc)^2}/r)$, $j_{R3}=(y-yc)*r*\sin(\sqrt{(x-xc)^2+(y-yc)^2}/r)$, $k_{R3}=r*\cos(\sqrt{(x-xc)^2+(y-yc)^2}/r)$, $(i_{R3}, j_{R3}, k_{R3})$ is a spherical point coordinate corresponding to the point P (x, y) on the two-dimensional region R3';

determine a three-dimensional vector $(L_{R1}, M_{R1}, N_{R1})$ of a point on the three-dimensional region R1 corresponding to a point P (x, y) on the two-dimensional region R1', wherein (xd, yd) is a coordinate of the centre of circle of the two-dimensional region R1', $L_{R1}=Xi_{R1}*X1+Yi_{R1}*X2+Zi_{R1}*X3$, $M_{R1}=Xi_{R1}*Y1+Yi_{R1}*Y2+Zi_{R1}*Y3$, $N_{R1}=Xi_{R1}*Z1+Yi_{R1}*Z2+Zi_{R1}*Z3$, $Xi_{R1}=i_{R1}/\sqrt{i_{R1}*i_{R1}+j_{R1}*j_{R1}+k_{R1}*k_{R1}}$, $Yi_{R1}=j_{R1}/\sqrt{i_{R1}*i_{R1}+j_{R1}*j_{R1}+k_{R1}*k_{R1}}$, $Zi_{R1}=k_{R1}/\sqrt{i_{R1}*i_{R1}+j_{R1}*j_{R1}+k_{R1}*k_{R1}}$, $i_{R1}=(x-xd)*r*\sin(\sqrt{(x-xd)^2+(y-yd)^2}/r)$, $j_{R1}=(y-yd)*r*\sin(\sqrt{(x-xd)^2+(y-yd)^2}/r)$, $k_{R1}=r*\cos(\sqrt{(x-xd)^2+(y-yd)^2}/r)$, $(i_{R1}, j_{R1}, k_{R1})$ is a spherical point coordinate corresponding to the point P (x, y) on the two-dimensional region R1;

determine a three-dimensional vector $(L_{R2}, M_{R2}, N_{R2})$ of a point on the three-dimensional region R2 corresponding to a point P (x, y) on the two-dimensional region R2', wherein $L_{R2}=Xi_{R2}*X1+Yi_{R2}*X2+Zi_{R2}*X3$, $M_{R2}=Xi_{R2}*Y1+Yi_{R2}*Y2+Zi_{R2}*Y3$, $N_{R2}=Xi_{R2}*Z1+Yi_{R2}*Z2+Zi_{R2}*Z3$, $Xi_{R2}=i_{R2}/\sqrt{i_{R2}*i_{R2}+j_{R2}*j_{R2}+k_{R2}*k_{R2}}$, $Yi_{R2}=j_{R2}/\sqrt{i_{R2}*i_{R2}+j_{R2}*j_{R2}+k_{R2}*k_{R2}}$, $Zi_{R2}=k_{R2}/\sqrt{i_{R2}*i_{R2}+j_{R2}*j_{R2}+k_{R2}*k_{R2}}$, $i_{R2}=-\cos(beta)*\sin(alpha)$, $j_{R2}=-\sin(beta)$, $k_{R2}=-\cos(beta)*\cos(alpha)$, $alpha=(x-xd)*\pi/(xc-xd)$, $beta=-(y-yd)*\pi/(2*r)$, $(i_{R2}, j_{R2}, k_{R2})$ is a spherical point coordinate corresponding to the point P (x, y) on the two-dimensional region R2'.

According to one example, the expanded image rendering module 740 may first obtain color information of a second point on the inner wall of the lumen directed by a three-dimensional vector corresponding to a third point on the two-dimensional projection plane according to the corresponding relationship between the two-dimensional projection plane and the inner wall of the lumen, and then obtain a two-dimensional expanded image of the three-dimensional lumen image by performing image rendering on the two-dimensional projection plane based on the obtained color information by using three-dimensional volume reconstruction, maximum intensity projection or three-dimensional surface reconstruction.

Taking software implementation as an example, the following will further describe how the device for rendering an expanded lumen image executes the control logic. In this example, the control logic in the present disclosure may be interpreted as computer executable instructions stored in the machine readable storage medium 620. When the processor 610 on the device for rendering an expanded lumen image of the present disclosure executes the control logic, by invoking the machine readable instructions stored in the machine readable storage medium 620, the machine readable instructions may further cause the processor 610 to:

obtain a plurality of viewpoints by sampling a centre line of a lumen based on a three-dimensional lumen image;

establish a spherical projection plane for each of the viewpoints, wherein a point on the spherical projection plane corresponds to a point on an inner wall of the lumen;

determine a corresponding relationship between a two-dimensional projection plane and the inner wall of the lumen according to a corresponding relationship between the spherical projection plane and the two-dimensional projection plane; and obtain a two-dimensional expanded image of the three-dimensional lumen image by performing image rendering on the two-dimensional projection plane according to the corresponding relationship between the two-dimensional projection plane and the inner wall of the lumen.

According to one example, when establishing a spherical projection plane, the machine readable instructions may cause the processor 610 to:

determine a gazing direction and a local coordinate system of a viewpoint, wherein a Z-axis direction of the local coordinate system is the gazing direction of the viewpoint; and establish a spherical projection plane by taking the viewpoint as a centre of sphere and R as a radius under the local coordinate system, wherein R is a preset radius value less than or equal to a radius r of the inner wall of the lumen.

Further, when determining a gazing direction and a local coordinate system of a viewpoint, the machine-executable instructions may further cause the processor 610 to:

determine a gazing direction of a current viewpoint according to positions of viewpoints immediately before and after the current viewpoint on the centre line; and determine an X-axis direction, a Y-axis direction and a Z-axis direction of a local coordinate system of the current viewpoint according to a connecting line between a previous viewpoint immediately before the current viewpoint and the current viewpoint and a local coordinate system of the previous viewpoint.

According to one example, a point on the spherical projection plane corresponding to a point on the inner wall of the lumen may refer that a first point on the spherical projection plane may correspond to a second point on the inner wall of the lumen directed by a three-dimensional vector of the first point. The three-dimensional vector of the first point is a vector constituted by the first point and the centre of sphere.

Further, a corresponding relationship between the spherical projection plane and the two-dimensional projection plane may include: a corresponding relationship between a three-dimensional vector of a first point on the spherical projection plane and a two-dimensional coordinate of a third point on the two-dimensional projection plane.

In such a case, when determining a corresponding relationship between a two-dimensional projection plane and the inner wall of the lumen according to a corresponding relationship between the spherical projection plane and the two-dimensional projection plane, the machine readable instructions may further cause the processor 610 to:

divide the spherical projection plane into three three-dimensional regions, including:

a three-dimensional region R1, which is a spherical surface positioned between an X-axis positive direction and a Z-axis negative direction, a three-dimensional region R2, which is a spherical surface positioned in an X-axis negative direction, and a three-dimensional region R3, which is a spherical surface excluding the three-dimensional regions R1 and R2;

determine an image rendering region of the two-dimensional projection plane, wherein the image rendering region may include:

a two-dimensional region R1' corresponding to the three-dimensional region R1, which is a semicircle with radius equal to a scaled lumen radius r and positioned on a left side of the image rendering region, the scaled lumen radius r may be obtained by multiplying a radius of the inner wall of the lumen with a preset scaling ratio, a two-dimensional region R2' corresponding to the three-dimensional region R2, which is a rectangle with width equal to nr and height equal to 2 r and positioned in a middle part of the image rendering region, and a two-dimensional region R3' corresponding to the three-dimensional region R3, which is a semicircle with radius equal to the scaled lumen radius r and positioned on a right side of the image rendering region; and determine a three-dimensional vector on one of the three-dimensional regions R1, R2 and R3 corresponding to a point on each of the two-dimensional regions R1', R2' and R3'.

Further, when obtaining a two-dimensional expanded image of the three-dimensional lumen image by performing image rendering on the two-dimensional projection plane according to the corresponding relationship between the two-dimensional projection plane and the inner wall of the lumen, the machine readable instructions may further cause the processor 610 to:

obtain color information of a second point on the inner wall of the lumen directed by a three-dimensional vector corresponding to a third point on the two-dimensional projection plane; and obtain a two-dimensional expanded image of the three-dimensional lumen image by performing image rendering on the two-dimensional projection plane based on the obtained color information.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures may have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Specific implementations of functions and roles of modules in the above device may be seen in detail in implementations of corresponding blocks in above methods, which are not unnecessarily elaborated herein.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Accordingly, other embodiments are within the scope of the following claims.

The invention claimed is:

1. A method of rendering an expanded lumen image, comprising:
obtaining a plurality of viewpoints by sampling a centre line of a lumen based on a three-dimensional lumen image;

establishing a spherical projection plane for each of the viewpoints, wherein a point on the spherical projection plane corresponds to a point on an inner wall of the lumen;

determining a relationship between a two-dimensional projection plane and the inner wall of the lumen according to a corresponding relationship between the spherical projection plane and the two-dimensional projection plane; and obtaining a two-dimensional expanded image of the three-dimensional lumen image by performing image rendering on the two-dimensional projection plane according to the determined relationship between the two-dimensional projection plane and the inner wall of the lumen, wherein establishing a spherical projection plane for each of the viewpoints comprises:

determining a gazing direction and a local coordinate system of the viewpoint, wherein a Z-axis direction of the local coordinate system is the gazing direction of the viewpoint; and establishing the spherical projection plane by taking the viewpoint as a centre of sphere and R as a radius under the local coordinate system, wherein R is a preset radius value less than or equal to a radius of the inner wall of the lumen.

2. The method of claim 1, wherein determining a gazing direction and a local coordinate system of a viewpoint comprises:

determining a gazing direction of a current viewpoint according to positions of viewpoints adjacent to the current viewpoint on the centre line; and determining an X-axis direction, a Y-axis direction and a Z-axis direction of a local coordinate system of the current viewpoint according to a connecting line between a previous viewpoint before the current viewpoint and the current viewpoint and a local coordinate system of the previous viewpoint.

3. The method of claim 1, wherein the point on the spherical projection plane corresponding to the point on the inner wall of the lumen comprises:

a first point on the spherical projection plane corresponding to a second point on the inner wall of the lumen directed by a three-dimensional vector of the first point, wherein the three-dimensional vector of the first point is a vector constituted by the first point and a centre of sphere of the spherical projection plane.

4. The method of claim 3, wherein the corresponding relationship between the spherical projection plane and the two-dimensional projection plane comprises:

a corresponding relationship between a three-dimensional vector of the first point on the spherical projection plane and a two-dimensional coordinate of a third point on the two-dimensional projection plane.

5. The method of claim 4, wherein determining a relationship between a two-dimensional projection plane and the inner wall of the lumen comprises:

dividing the spherical projection plane into a plurality of three-dimensional regions;

determining an image rending region of the two-dimensional projection plane, the image rending region comprising a plurality of two-dimensional regions respectively corresponding to the plurality of three-dimensional regions of the spherical projection plane; and determining a three-dimensional vector on one of the three-dimensional regions corresponding to a point on one of the two-dimensional regions.

6. The method of claim 5, wherein the plurality of three-dimensional regions comprises:

a three-dimensional region R1, which is a spherical surface positioned between an X-axis positive direction and a Z-axis negative direction, a three-dimensional region R2, which is a spherical surface positioned in an X-axis negative direction, and a three-dimensional region R3, which is a spherical surface excluding the three-dimensional regions R1 and R2, and wherein the image rendering region comprises:

a two-dimensional region R1' corresponding to the three-dimensional region R1, which is a semicircle with radius equal to a scaled lumen radius r and positioned on a left side of the image rendering region, the scaled lumen radius r being obtained by multiplying a radius of the inner wall of the lumen with a preset scaling ratio, a two-dimensional region R2' corresponding to the three-dimensional region R2, which is a rectangle with width equal to $\pi r$ and height equal to 2r and positioned in a middle part of the image rendering region, and a two-dimensional region R3' corresponding to the three-dimensional region R3, which is a semicircle with radius equal to the scaled lumen radius r and positioned on a right side of the image rendering region.

7. The method of claim 4, wherein obtaining a two-dimensional expanded image of the three-dimensional lumen image comprises:

obtaining color information of the second point on the inner wall of the lumen directed by a three-dimensional vector corresponding to the third point on the two-dimensional projection plane; and obtaining a two-dimensional expanded image of the three-dimensional lumen image by performing image rendering on the two-dimensional projection plane based on the obtained color information.

8. A device for rendering an expanded lumen image, the device comprising:

a processor which invokes machine readable instructions corresponding to a control logic for rendering an expanded lumen image stored on a storage medium and executes the machine readable instructions to:

obtain a plurality of viewpoints by sampling a centre line of a lumen based on a three-dimensional lumen image;

establish a spherical projection plane for each of the viewpoints, wherein a point on the spherical projection plane corresponds to a point on an inner wall of the lumen;

determine a relationship between a two-dimensional projection plane and the inner wall of the lumen according to a corresponding relationship between the spherical projection plane and the two-dimensional projection plane; and obtain a two-dimensional expanded image of the three-dimensional lumen image by performing image rendering on the two-dimensional projection plane according to the determined relationship between the two-dimensional projection plane and the inner wall of the lumen, wherein the machine readable instructions causes the processor to establish the spherical projection plane by:

determining a gazing direction and a local coordinate system of a viewpoint, wherein a Z-axis direction of the local coordinate system is the gazing direction of the viewpoint and establishing the spherical projection plane by taking the viewpoint as a centre of sphere and R as a radius under the local coordinate system, wherein R is a preset radius value less than or equal to a radius of the inner wall of the lumen.

9. The device of claim 8, wherein the machine readable instructions causes the processor to determine the gazing direction and the local coordinate system of the viewpoint by:

determining a gazing direction of a current viewpoint according to positions of viewpoints adjacent to the current viewpoint on the centre line; and determining an X-axis direction, a Y-axis direction and a Z-axis direction of a local coordinate system of the current viewpoint according to a connecting line between a previous viewpoint before the current viewpoint and the current viewpoint and a local coordinate system of the previous viewpoint.

10. The device of claim 8, wherein the point on the spherical projection plane corresponding to the point on an inner wall of the lumen comprises:

a first point on the spherical projection plane corresponding to a second point on the inner wall of the lumen directed by a three-dimensional vector of the first point, wherein the three-dimensional vector of the first point is a vector constituted by the first point and a centre of sphere of the spherical projection plane.

11. The device of claim 10, wherein the corresponding relationship between the spherical projection plane and the two-dimensional projection plane comprises:

a corresponding relationship between a three-dimensional vector of the first point on the spherical projection plane and a two-dimensional coordinate of a third point on the two-dimensional projection plane.

12. The device of claim 11, wherein the machine readable instructions may further cause the processor to determine the relationship between the two-dimensional projection plane and the inner wall of the lumen by:

dividing the spherical projection plane into a plurality of three-dimensional regions;

determining an image rendering region of the two-dimensional projection plane, wherein the image rendering region comprises a plurality of two-dimensional regions respectively corresponding to the plurality of three-dimensional regions; and determine a three-dimensional vector on one of the three-dimensional regions corresponding to a point on one of the two-dimensional regions.

13. The device of claim 12, wherein the plurality of three-dimensional regions comprises:

a three-dimensional region R1, which is a spherical surface positioned between an X-axis positive direction and a Z-axis negative direction, a three-dimensional region R2, which is a spherical surface positioned in an X-axis negative direction, and a three-dimensional region R3, which is a spherical surface excluding the three-dimensional regions R1 and R2, and wherein the plurality of two-dimensional regions comprises:

a two-dimensional region R1' corresponding to the three-dimensional region R1, which is a semicircle with radius equal to a scaled lumen radius r and positioned on a left side of the image rendering region, the scaled lumen radius r being obtained by multiplying a radius of the inner wall of the lumen with a preset scaling ratio, a two-dimensional region R2' corresponding to the three-dimensional region R2, which is a rectangle with width equal to $\pi r$ and height equal to 2r and positioned in a middle part of the image rendering region, and a two-dimensional region R3' corresponding to the three-dimensional region R3, which is a semicircle with radius equal to the scaled lumen radius r and positioned on a right side of the image rendering region.

14. The device of claim 11, wherein the machine readable instructions may further cause the processor to obtain the two-dimensional expanded image of the three-dimensional lumen image by:

obtaining color information of the second point on the inner wall of the lumen directed by a three-dimensional vector corresponding to the third point on the two-dimensional projection plane; and obtaining a two-dimensional expanded image of the three-dimensional lumen image by performing image rendering on the two-dimensional projection plane based on the acquired color information.

15. A non-transitory computer readable storage medium storing instructions executable by one or more processors and upon such execution cause the one or more processors to perform operations comprising:

obtaining a plurality of viewpoints by sampling a centre line of a lumen based on a three-dimensional lumen image;

establishing a spherical projection plane for each of the viewpoints, wherein a point on the spherical projection plane corresponds to a point on an inner wall of the lumen;

determining a relationship between a two-dimensional projection plane and the inner wall of the lumen according to a corresponding relationship between the spherical projection plane and the two-dimensional projection plane; and obtaining a two-dimensional expanded image of the three-dimensional lumen image by performing image rendering on the two-dimensional projection plane according to the determined relationship between the two-dimensional projection plane and the inner wall of the lumen, wherein establishing a spherical projection plane for each of the viewpoints comprises:

determining a gazing direction and a local coordinate system of the viewpoint, wherein a Z-axis direction of the local coordinate system is the gazing direction of the viewpoint and establishing the spherical projection plane by taking the viewpoint as a centre of sphere and R as a radius under the local coordinate system, wherein R is a preset radius value less than or equal to a radius of the inner wall of the lumen.

16. The non-transitory computer readable storage medium of claim 15, wherein the point on the spherical projection plane corresponding to the point on the inner wall of the lumen comprises a first point on the spherical projection plane corresponding to a second point on the inner wall of the lumen directed by a three-dimensional vector of the first point, wherein the three-dimensional vector of the first point is a vector constituted by the first point and a centre of sphere of the spherical projection plane, wherein the corresponding relationship between the spherical projection plane and the two-dimensional projection plane comprises a corresponding relationship between a three-dimensional vector of the first point on the spherical projection plane and a two-dimensional coordinate of a third point on the two-dimensional projection plane, and wherein determining a relationship between a two-dimensional projection plane and the inner wall of the lumen comprises:
  dividing the spherical projection plane into a plurality of three-dimensional regions;
  determining an image rending region of the two-dimensional projection plane, the image rending region comprising a plurality of two-dimensional regions respectively corresponding to the plurality of three-dimensional regions of the spherical projection plane; and
  determining a three-dimensional vector on one of the three-dimensional regions corresponding to a point on one of the two-dimensional regions.

17. The non-transitory computer readable storage medium of claim 16, wherein obtaining a two-dimensional expanded image of the three-dimensional lumen image comprises:
  obtaining color information of the second point on the inner wall of the lumen directed by a three-dimensional vector corresponding to the third point on the two-dimensional projection plane; and
  obtaining a two-dimensional expanded image of the three-dimensional lumen image by performing image rendering on the two-dimensional projection plane based on the obtained color information.

* * * * *